United States Patent [19]

Henck

[11] Patent Number: 4,862,582
[45] Date of Patent: Sep. 5, 1989

[54] METHOD FOR MANUFACTURING AN ELECTRIC MOTOR

[76] Inventor: Ronald W. Henck, S16 W32069 Highmeadows, Delafield, Wis. 53018

[21] Appl. No.: 156,218

[22] Filed: Feb. 16, 1988

Related U.S. Application Data

[62] Division of Ser. No. 862,276, May 12, 1986.

[51] Int. Cl.$^4$ ............................................. H02K 15/14
[52] U.S. Cl. .................... 29/596; 264/272.2; 310/43; 310/89; 310/90
[58] Field of Search ...................... 29/596; 264/272.19, 264/272.2; 310/43, 42, 89, 90, 91

[56] References Cited

U.S. PATENT DOCUMENTS

| | | | |
|---|---|---|---|
| 4,173,822 | 11/1979 | Futterer et al. | 29/596 |
| 4,337,405 | 6/1982 | Hishida | 310/43 |
| 4,357,552 | 11/1982 | MacMillan | 310/43 X |
| 4,384,226 | 5/1983 | Sato | 310/43 X |
| 4,573,258 | 3/1986 | I et al. | 29/596 |

Primary Examiner—Carl E. Hall
Attorney, Agent, or Firm—Foley & Lardner

[57] ABSTRACT

A method of manufacturing an electric motor including the steps of providing a cylindrical housing having a plurality of recesses spaced from one end, providing a shaft bearing having a radially extending flange around the periphery of the bearing, providing a molding chamber, locating the end of the housing in the molding chamber, locating the bearing in the molding chamber in proper position relative to the end of the housing, delivering molten plastic into the chamber and allowing the molten plastic to harden to form the end bell with the shaft bearing positively located with respect to the end of housing.

3 Claims, 2 Drawing Sheets

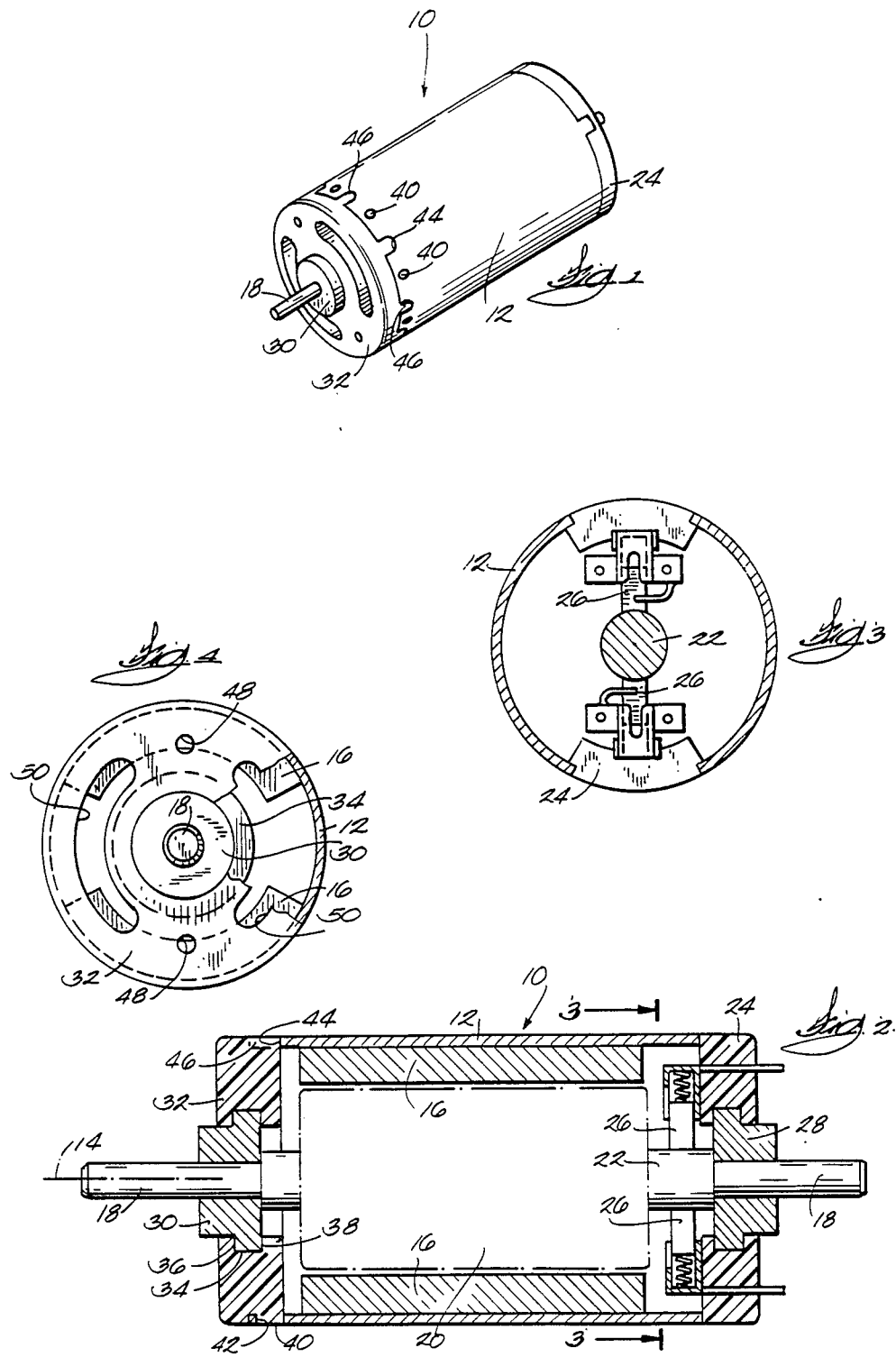

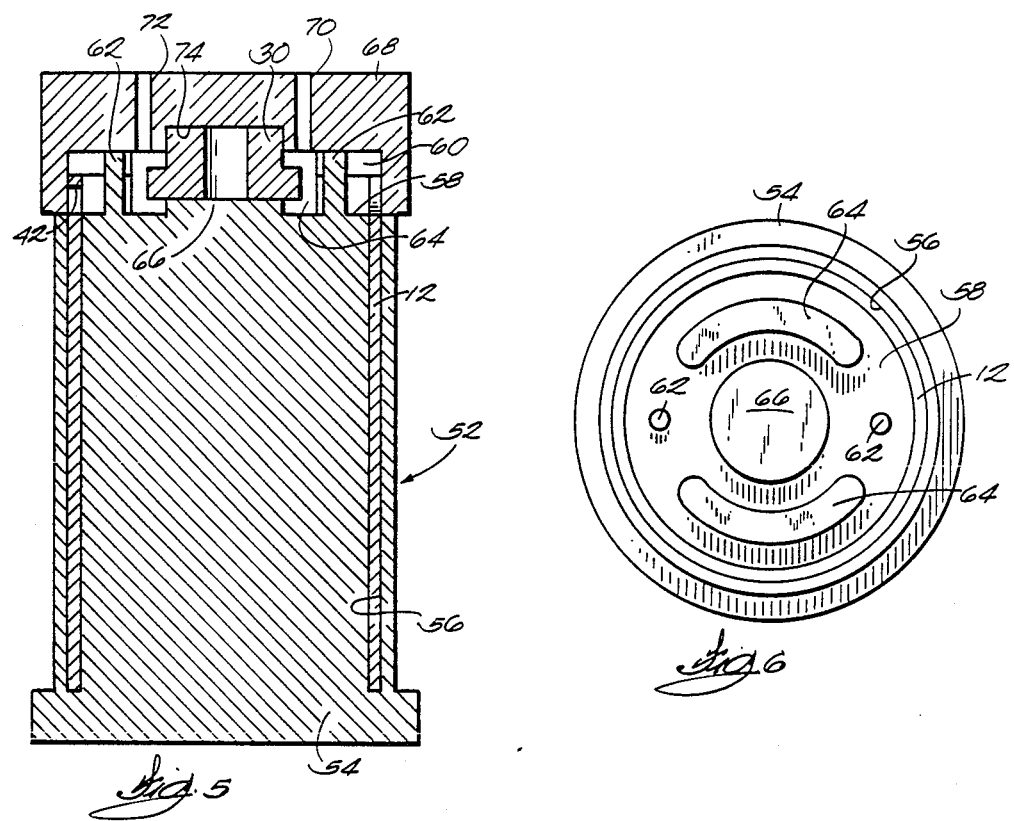
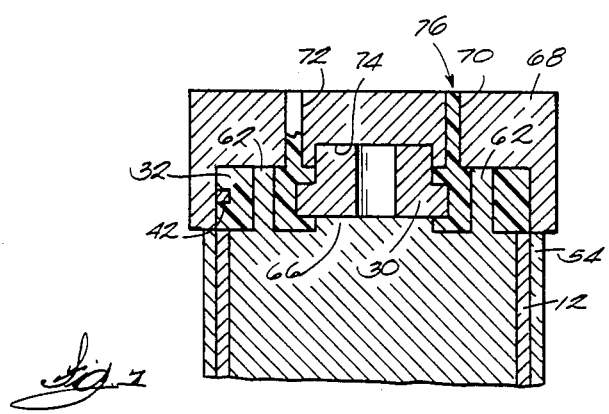

METHOD FOR MANUFACTURING AN ELECTRIC MOTOR

This is a divisional of a co-pending application Ser. No. 862,276 filed on 5-12-86.

BACKGROUND OF THE INVENTION

The invention relates to electric motors and to methods for manufaturing electric motors. More particularly, the invention relates to end bells or caps for electric motors and to methods for forming the end bell or cap of an electric motor.

MacMillan U.S. Pat. No. 4,357,552 discloses an end bell "molded about" a portion of the motor casing. The outer surface of the end bell has therein a cylindrical recess or pocket which receives and supports a bearing which in turn supports the output shaft of the motor.

Hult U.S. Pat. No. 3,760,209 discloses a motor including a two-piece end bell which "captures" and supports a bearing for the output shaft.

Attention is also directed to the following U.S. patents which disclose electric motors:

Frey, U.S. Pat. No. 4,088,910, May 9, 1978; Lindgren, U.S. Pat. No. 3,161,794, Dec. 15, 1964 Singh et al., U.S. Pat. No. 4,031,610, June 28, 1977 de Jong, U.S. Pat. No. 4,414,481, Nov. 8, 1983 Kaufman, Jr., U.S. Pat. No. 4,048,530, Sept. 13, 1977 Hahndorf et al., U.S. Pat. No. 3,391,290, July 2, 1968 Spitler et al., U.S. Pat. No. 4,384,224, May 17, 1983 Shiseki et al., U.S. Pat. No. 4,438,358, Mar. 20, 1984.

SUMMARY OF THE INVENTION

The invention provides an electric motor comprising a generally cylindrical housing including and end, and a rotor assembly located inside the housing and including a shaft extending outwardly through the end of the housing. The rotor assembly also includes an armature assembly mounted on the shaft.

The motor further comprises a bearing for rotatably supporting the shaft, and a unitary (i.e., one-piece), plastic end bell which is molded around the bearing and which is molded in place on the end of the housing to close the end of the housing. Preferably, the bearing includes an annular flange extending outwardly and generally perpendicularly to the shaft, the flange having opposite inner and outer surfaces spaced in the direction of the axis of the shaft, and the bearing is captured by or molded within the end bell so that the end bell contacts both of the inner and outer surfaces of the bearing flange to hold the bearing in place relative to the housing.

In the preferred embodiment, the housing has therein a plurality of apertures spaced from the end of the housing. When the end bell is molded in place relative to the housing, the end bell forms a plurality of projections respectively received in the apertures for securing the end bell to the housing.

The invention also provides a method for manufacturing the above-described motor. The method comprises the steps of providing the housing and the bearing, and providing a mold form defining a molding chamber for the end bell. In the preferred embodiment, the mold form includes an annular recess which receives the housing, and the mold form forms the molding chamber around the end of the housing. More particularly, the mold form includes a base which receives the housing and which defines the bottom of the molding chamber, and a top which is mounted on the base over the end of the housing and which defines the sides and top of the molding chamber. The base includes an upwardly extending projection which supports the bearing within the molding chamber, and the top includes a generally cylindrical recess which receives the upper or outer end of the bearing for positioning the bearing relative to the end of the housing.

The method further comprises the steps of locating the housing in the mold form with the end of the housing in the molding chamber, and placing the bearing inside the molding chamber on the projection. As mentioned above, the recess in the top of the mold form holds the bearing in proper position.

The method further comprises the steps of delivering molten plastic into the mold chamber. The plastic surrounds the bearing and becomes molded to the housing so that, when the plastic hardens, the plastic forms the end bell.

A principal feature of the invention is the provision of a unitary or one-piece end bell molded around a bearing. This construction is simpler than known constructions and provides more effective support of the bearing.

Another principal feature of the invention is the method for making the motor. The method is simple and yet provides the above-described improved end bell.

Other principal features and advantages of the invention will become apparent to those skilled in the art upon review of the following detailed description, claims and drawings.

DESCRIPTION OF THE DRAWINGS

FIG. 1 is a perspective view of an electric motor embodying the invention.

FIG. 2 is a cross-sectional view of the motor.

FIG. 3 is a cross-sectional view taken along line 3—3 in FIG. 2.

FIG. 4 is an end view (the left end in FIGS. 1 and 2) of the motor.

FIG. 5 is a vertical cross-sectional view of a mold form used in performing the method of the invention.

FIG. 6 is a top view of the base of the mold form.

FIG. 7 is a partial view of the upper portion of the mold form shown in FIG. 5 with molten plastic filling the molding chamber.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

An electric motor 10 embodying the invention is shown in the drawings. As best shown in FIG. 2, the motor 10 comprises a generally cylindrical housing 12 including opposite right and left ends and a longitudinal axis 14. The motor 10 also comprises a pair of stator elements 16 mounted inside the housing 12, and a rotor assembly located inside the housing 12 and inside the stator elements 16. The rotor assembly includes a shaft 18 extending along the longitudinal axis 14 of the housing 12, an armature assembly 20 mounted on the shaft 18, and a commutator 22 connected to the armature assembly 20.

The motor 10 also comprises a pair of brushes 26 which contact the commutator 22 and which are adapted to be connected to a power source.

The motor 10 further comprises a bearing 28 rotatably supporting the right end of the shaft 18, and a bearing 30 rotatably supporting the left end of the shaft 18.

The motor 10 further comprises a unitary (i.e., one-piece), plastic end bell 32 closing the left end of the housing 12 and being molded around the bearing 30. The bearing 30 and the end bell 32 include interengaging means for preventing movement of the bearing 30 relative to the end bell 32 in both directions along the longitudinal axis 14 of the housing. While various suitable interengaging means can be employed, in the illustrated construction, the bearing 30 includes an annular flange 34 extending radially outwardly and generally perpendicularly to the longitudinal axis 14. The flange 34 has opposite outer and inner or left and right surfaces 36 and 38, respectively, spaced in the direction of the longitudinal axis 14, and the end bell 32 is molded around the bearing 30 so as to contact both of the left and right surfaces 36 and 38, thereby preventing movement of the bearing 30 in the direction of the longitudinal axis 14. The end bell 32 also contacts the radially outer surfaces of the bearing 30 to prevent movement of the bearing 30 radially of the longitudinal axis 14.

The motor 10 further comprises interengaging means on the housing 12 and on the end bell 32 for securing the end bell 32 to the housing 12. While various suitable interengaging means can be used, in the preferred embodiment, the interengaging means includes, in the housing 12, a plurality of recesses 42 adjacent the end of the housing, and, on the end bell 32, a plurality of integral projections 40 respectively received in the recesses 42. In the illustrated construction, the housing 12 includes a plurality of apertures spaced from the end of the housing 12 and defining the recesses 42. Furthermore, in the preferred embodiment, the interengaging means includes, in the left end of the housing 12, a plurality of longitudinally extending recesses 44, and, on the end bell 32, a plurality of integral projections 46 respectively received in the longitudinally extending recesses 44. Both the apertures 42 and the longitudinally extending recesses 44 prevent rotation of the end bell 32 relative to the housing 12, and the apertures 42 further prevent movement of the end bell relative to the housing in the direction of the longitudinal axis 14.

As shown in FIG. 4, the end bell 32 has therein a pair of generally cylindrical openings 48 for facilitating mounting of the motor 10, and a pair of arcuate vent openings 50.

The motor 10 further comprises (See FIGS. 2 and 3) and end bell 24 closing the right end of the housing 12 and supporting the brushes 26 and the bearing 28. While the end bell 24 can be of conventional construction, in the illustrated construction, the end bell 24 at least partially embodies the invention in that it is unitary and captures the bearing 28. The end bell 24 can be secured to the right end of the housing 12 by any suitable means.

A mold form 52 for performing the method of the invention, i.e., a method for manufacturing the motor 10, is illustrated in FIGS. 5 through 7.

As best shown in FIG. 5, the mold 52 form includes a base 54 which defines an annular recess 56 for receiving the housing 12. The right end of the housing 12 is inserted into the recess 56 in the base 54, and the left end of the housing 12 extends upwardly out of the base 54. The base 54 has an upper surface 58 which defines the bottom of a molding chamber 60 for forming the end bell 32. The base 54 includes a pair of generally cylindrical, upwardly extending projections 62 which form the openings 48 in the end bell 32, and a pair of arcuate, upwardly extending projections 64 which form the arcuate openings 50 in the end bell. The base 54 also includes a generally cylindrical, upwardly extending projection 66 for supporting the bearing 30 within the molding chamber 60.

The mold form 52 also includes a top 68 which is mounted on the base 54 and which defines the sides and top of the molding chamber 60. Thus, the top 68 and the base 54 cooperate to define the molding chamber 70. The top 68 contacts the projections 62 and the arcuate projections 64, and the top 68 fits over the end of the housing 12 and is thereby held in position relative to the housing 12. The top 68 can be secured to the base 54 by any suitable means.

The top 68 includes a gate 70 communicating with the molding chamber 60, and a vent 72 communicating with the molding chamber 60. Preferably, the top 68 also includes means for positioning the bearing 30 relative to the end of the housing 12. While various suitable positioning means can be used, in the illustrated construction, the positioning means includes a generally cylindrical recess 74 in the top 78 of the mold form 52. The recess 74 receives the top or outer portion of the bearing 30 and thereby positions the bar within the molding chamber 60 and relative to the end of the housing 12.

The method of the invention is performed as follows: The housing 12 is inserted into the annular recess 56 in the base 54, as shown in FIG. 5, and the bearing 30 is placed on the projection 66. The top 68 is then placed over the end of the housing 12 and on the base 54 with the outer portion of the bearing 30 received in the recess 74. When the top 68 is placed on the base 54, the top 68 and base 54 define the molding chamber 60, the end of the housing 12 is located within the molding chamber 60, and the bearing 30 is located within the molding chamber 60 in proper position relative to the end of the housing 12. Finally, molten plastic 76 is delivered into the molding chamber 60 via the gate 70. As shown in FIG. 7, the molten plastic 76 surrounds the bearing 30 and fills the apertures 43 and the longitudinally extending recesses 44. When the plastic hardens, it forms the end bell 32 closing the end of the housing 12 and surrounding or capturing the bearing 30.

In accordance with this invention an end bell closure is provided for the motor housing 12 which is molded in place and secured to the motor housing 12 through a molded interengagement between the end bell and the housing 12 without the need for any separate screws or the like or the need for additional assembly steps such as deforming the housing end to engage the end bell, while at the same time the bearing 30 is molded in place in the end bell. The location of the bearing axis is thereby accurately controlled for true mounting of the motor armature. This has a positive effect on improving motor performance and extending motor life. For example, by maintaining a concentric relationship between the armature and the stator magnets 16, a stronger and more efficient magnetic field is produced. The preferred interengagement is shown as molded projections 40 in apertures or recesses 42. This holds the end bell assembled on the housing 12. The engagement between the projections 46 and recesses 44 resists any torque which may be applied to the end bell in operation, thereby allowing this concept to be used with larger size motors, if desired.

Various other features and advantages of the invention are set forth in the following claims.

I claim:

1. A method of forming an end bell on a cylindrical housing of an electric motor, said method comprising the steps of;

forming a plurality of first recesses in one end of the cylindrical motor housing, forming a shaft bearing with a radially extending flange around the periphery thereof, providing a molding form including a top and a base, forming a cylindrical opening corresponding to the cylindrical housing in the base, positioning the cylindrical housing in the cylindrical opening in the base with said one end projecting outward from the base with the first recesses exposed, positioning a shaft bearing on the base in axial alignment with the cylindrical housing, forming a cylindrical molding chamber in said top having a diameter corresponding to the diameter of said housing and a recess corresponding to the shape of said shaft bearing in axial alignment with said cylindrical molding chamber, placing the top on the base to enclose the exposed end of the cylinder and the shaft bearing, filling the molding chamber and the recesses in the end of the housing with molten plastic, and allowing the molten plastic to harden whereby the shaft bearing is positively located with respect to the cylinder housing and the hardened plastic interlockingly engages both said radially extending flange and said first recesses in the housing.

2. The method according to claim 1 including the step of forming a platform on said base to support said shaft bearing, said platform being smaller than said flange on said shaft bearing whereby said plastic surrounds said flange on said shaft bearing.

3. The method according to claim 2 including the step of forming a pair of arcuate projections on said base to define vent openings in said end bell.

* * * * *